United States Patent [19]
Pierce

[11] Patent Number: 5,335,695
[45] Date of Patent: Aug. 9, 1994

[54] HEIGHT CONTROL VALVE WITH ADJUSTABLE SPOOL

[75] Inventor: William C. Pierce, Muskegon, Mich.

[73] Assignee: Nai Neway, Inc., Muskegon, Mich.

[21] Appl. No.: 78,988

[22] Filed: Jun. 16, 1993

[51] Int. Cl.⁵ .............................................. B60G 11/26
[52] U.S. Cl. .................................. 137/627.5; 91/390; 280/714
[58] Field of Search ....................... 137/627.5; 91/390; 280/714

[56] References Cited

U.S. PATENT DOCUMENTS

| | | |
|---|---|---|
| 2,939,724 | 6/1960 | Broadwell et al. |
| 2,959,426 | 11/1960 | Augustin |
| 2,989,983 | 6/1961 | Valentine |
| 2,997,314 | 8/1961 | Hill ....................................... 280/714 |
| 3,048,193 | 8/1962 | Cislo .................................... 137/627.5 |
| 3,071,394 | 1/1963 | Miller .............................. 280/714 X |
| 3,091,257 | 5/1963 | Ballard ............................... 137/627.5 |
| 3,145,032 | 8/1964 | Turek |
| 3,209,784 | 10/1965 | Schwartz |
| 3,635,460 | 1/1972 | Shilton et al. |
| 4,886,092 | 12/1989 | Barzelay |
| 5,161,579 | 11/1992 | Anderson, Jr. |

OTHER PUBLICATIONS

SAE Technical Paper 881881 explaining the background of the Neway height control valve. Nov. 1988. The Neway brochure discloses a conventional height control valve of the prior art wherein the spool is fixed in position, axially. 1992.

Primary Examiner—Robert G. Nilson
Attorney, Agent, or Firm—Varnum, Riddering, Schmidt & Howlett

[57] ABSTRACT

A height control valve is for controlling the height of an air spring is disclosed, wherein the controlled height of the air spring can be easily adjusted. The height control valve comprises an interior bore in communication with an inlet port, an exhaust port and an air spring port. A hollow piston is movable within the valve bore in response to changes in the height of an air spring. A sealing member is biased onto a valve seat to seal the inlet port, and an open end of the piston abuts the sealing member to seal the exhaust port. Movement of the piston toward the sealing member disengages the sealing member from its valve seat, placing the spring port into communication with the inlet port. Axial movement of the piston away from the disk valve places the spring port into communication with the exhaust port through the interior of the piston. The controlled height of the air spring is adjusted by adjusting the axial position of the seat within the valve bore.

24 Claims, 5 Drawing Sheets

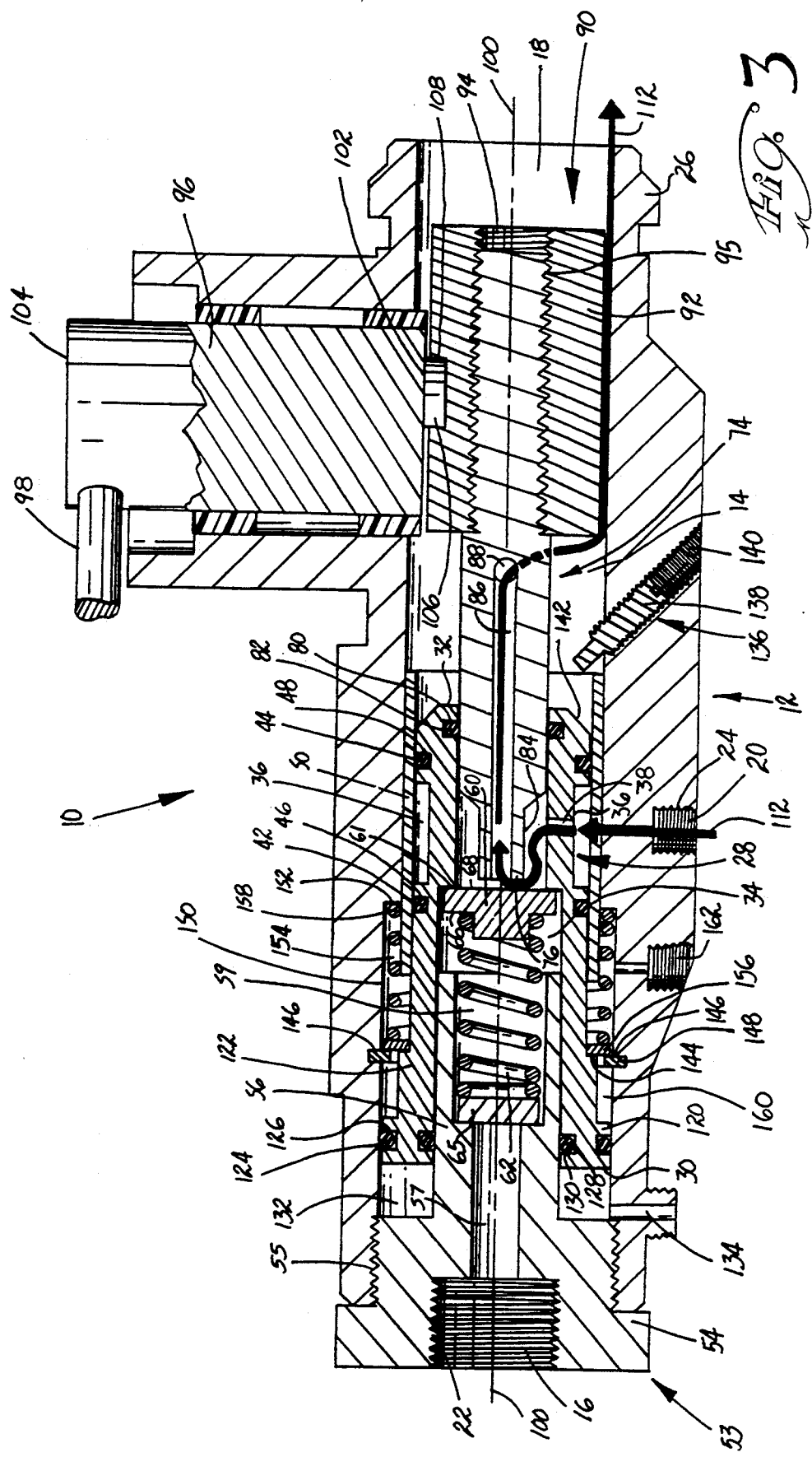

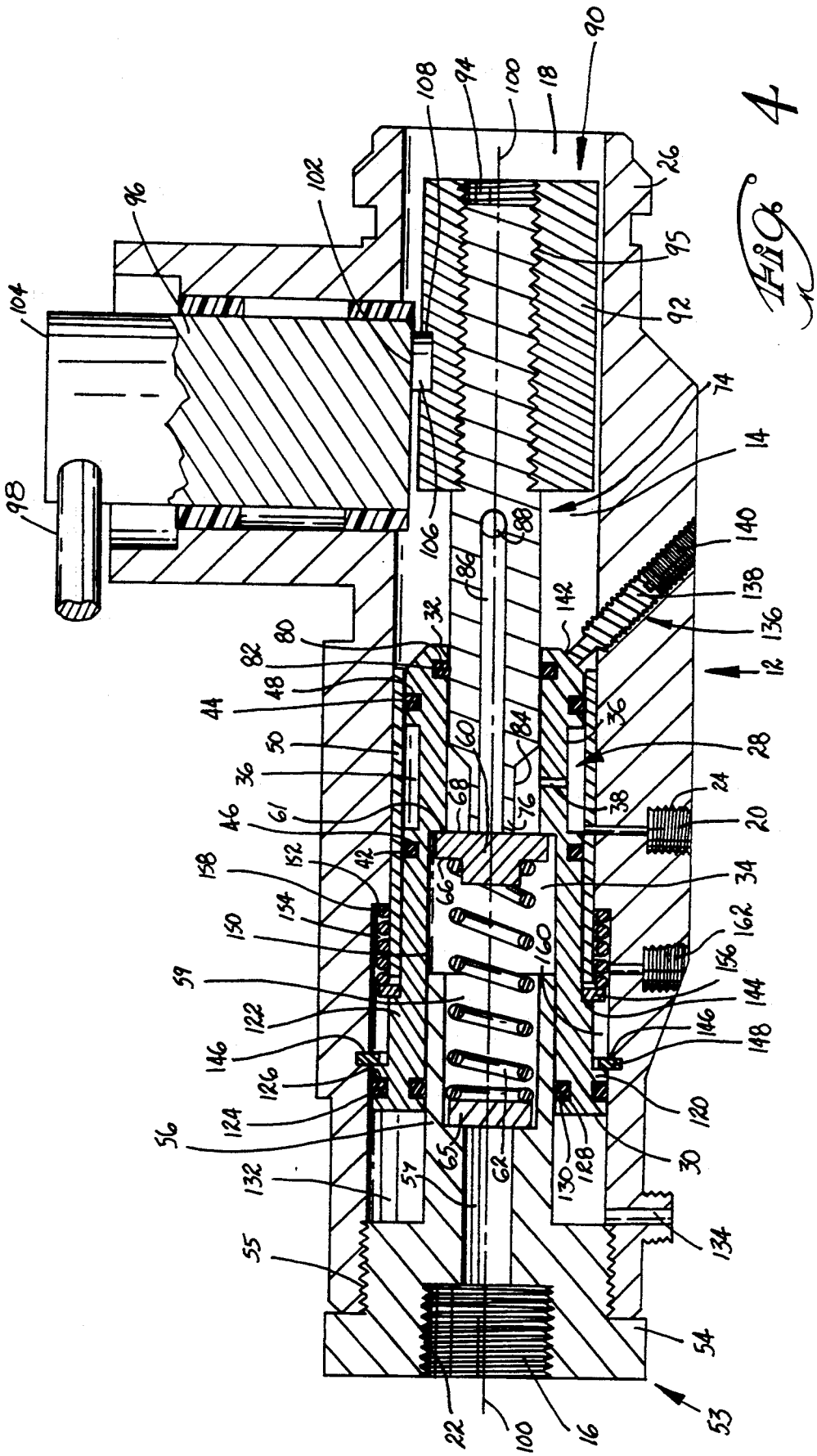

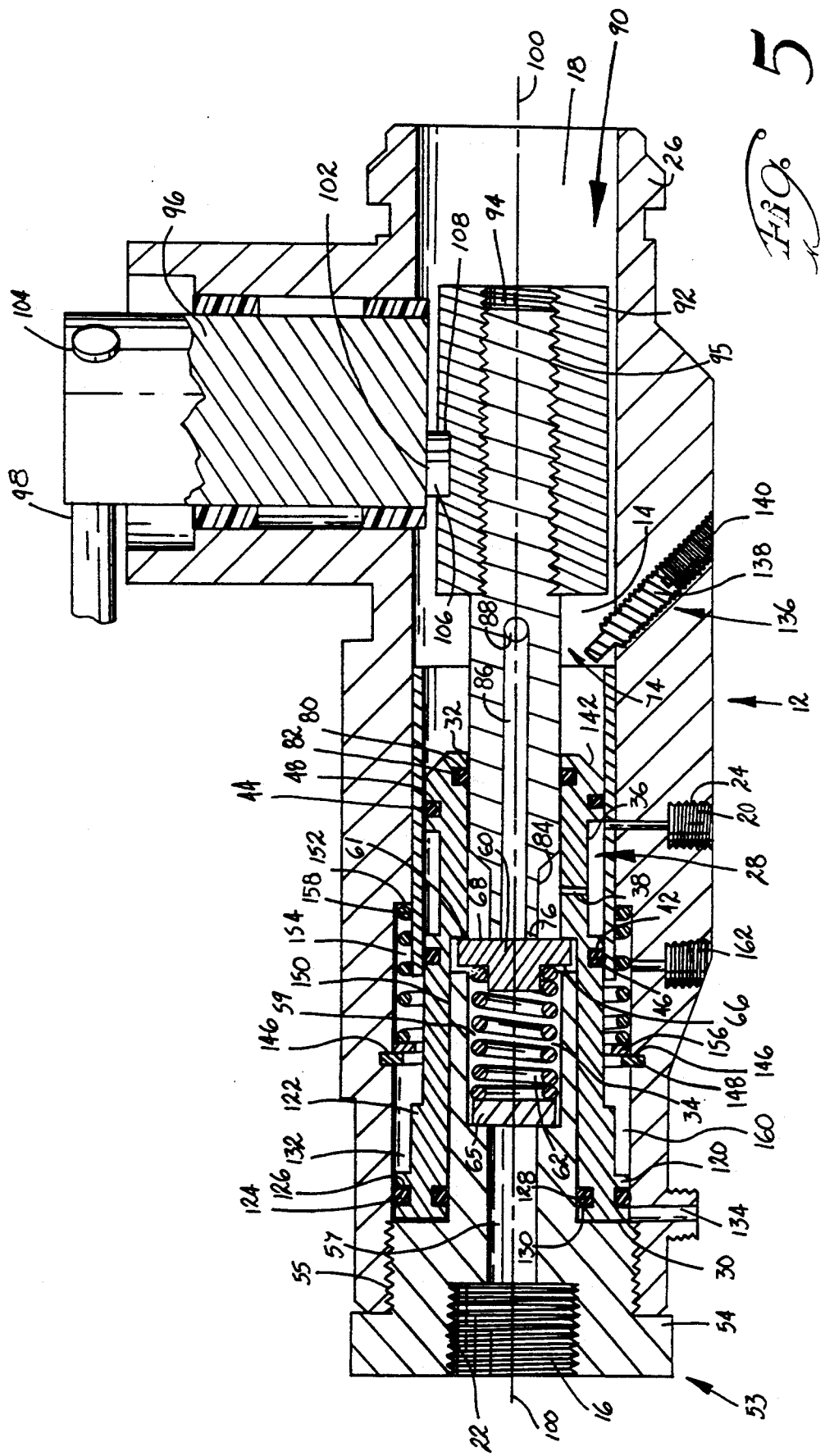

HEIGHT CONTROL VALVE WITH ADJUSTABLE SPOOL

BACKGROUND OF THE INVENTION

1. Field of the Invention

The invention relates to height control valves in vehicle suspensions and, more particularly, to a height control valve with a mechanism for adjusting the height of the suspension.

2. State of the Prior Art

Air suspension systems have become increasingly popular for use in vehicle suspensions, seats, and cabs on semitrailer truck rigs and other vehicles. Most typically employ a height control valve which maintains the design height of the suspension. In a semitrailer suspension, for example, the design height is the spacing between the frame and the axle. The height control valve senses spacing greater or less than the design height and, accordingly, adjusts the pressure in the air springs disposed between the frame and axle to maintain the height at a controlled value. The air suspension system with a height control valve maintains a uniform height of the air spring over a range of vehicle loading conditions.

The height control valve operates by selectively admitting air into, or exhausting air from, an air spring. The air spring is positioned between the truck frame and a trailing arm. The trailing arm carries the axle so that adjusting the air spring pressure also adjusts the distance between the truck frame and the axle. The height control valve typically mounts on the truck frame and has a control arm which connects to the trailing arm through a linkage. As the distance between the truck frame and trailing arm varies, the linkage causes the control arm to rotate a control shaft inside of the height control valve, which, in turn, selectively permits air to be admitted to or exhausted from the air spring.

Typically, the height control valve has three ports: an air spring port connected to the air spring, an inlet port connected to a source of pressurized air, and an exhaust port open to the atmosphere. To increase the height of the air spring, the height control valve opens fluid communication between the air spring port and the inlet port, allowing air to flow from the pressurized air source, through the height control valve and into the air spring. To decrease the height of the air spring, the height control valve opens fluid communication between the air spring port and the exhaust port, allowing air to flow out of the air spring through the height control valve, and to atmosphere through the exhaust port. When the air spring is at the proper height, the valve is in a neutral position wherein neither the inlet nor exhaust port communicates with the air spring.

Occasionally, a vehicle operator desires to adjust the neutral position of the height control valve, thus changing the design height of the controlled portion of the vehicle. European standards require a system for manually adjusting the neutral position of the height control valve so that the vehicle can be manually raised or lowered by the introduction of air to the air spring or exhaustion of air from the air spring. A complicated add-on mechanism is connected to the height control valve to perform such functions and comply with the European standards.

An alternative solution is disclosed in U.S. Pat. No. 2,959,426 to Augustin, issued Nov. 8, 1960, which discloses a height control valve having two neutral positions. The basic operation of the valve is similar to commonly available height control valves. Air pressure at the inlet port, assisted by a small return spring, biases a disc valve against an annular valve seat to isolate the inlet port from the valve chamber. The valve chamber fluidly communicates with the air spring, and receives a tubular hollow plunger. One end of the hollow plunger fluidly communicates with the exhaust port. In the neutral position of the valve, the opposite end of the hollow plunger abuts the disc valve. Thus, in the neutral position, the air spring is isolated from the inlet port by the disc valve and from the exhaust port by the sealing abutment of the plunger with the disc valve. Axial movement of the plunger towards the disc valve moves the disc valve away from the valve seat, placing the inlet port into fluid communication with the air spring, and causing air to flow into the air spring through the inlet port. Axial movement of the hollow plunger away from the valve seat places the air spring into fluid communication with the exhaust port through the hollow actuator rod, exhausting air from the air spring.

Typically, a linkage connects the vehicle frame to the vehicle axle such that variations in the height therebetween are translated into angular rotation of a control arm on the height control valve. Angular rotation of the control arm translates into angular rotation of a control cylinder having a pin eccentrically mounted at one end. This pin is received within a groove in the hollow plunger such that angular rotation of the control cylinder is translated into axial movement of the plunger, providing feedback to the control valve for adjusting the height of the air spring. Typically, the groove is narrowly sized to accommodate the pin.

In the Augustin patent, the groove is disclosed as being considerably wider than the pin, and a spring biases one face of the groove against the pin. Upon the selective application of pressurized air to a control port, the opposite face of the groove is biased against the pin. Thus, the height control valve is provided with two neutral positions with respect to a given angular position of the control rod, depending upon which face of the groove is biased against the pin. While this design does provide an additional neutral position, thus an additional control height at which the vehicle can be operated, it makes no provision for variable adjustment of the other neutral positions between these two predetermined neutral positions.

SUMMARY OF THE INVENTION

In one of its aspects, the invention relates to a height control valve for an air spring. The height control valve comprises a valve body having an internal chamber, an inlet port, an exhaust port, and an air spring port, each of the ports being in communication with the internal chamber. A valve means comprising a piston within the chamber controls alternate communication between the inlet port and air spring port in a first mode, between the exhaust port and the air spring port in a second mode, and closing communication between all of the ports in a neutral mode. The valve means further comprises a seat within the chamber and the piston has an end proximal to the seat. The piston operably connects to a height sensing means for the air spring, and is reciprocally movable within the chamber in response to changes in the height of the air spring. In a first position, the piston end extends past the seat in the first mode; in a second position, the piston end is withdrawn from and spaced away from the seat in the second mode; and in a neutral position, the piston end is aligned with the seat in the neutral mode. According to the invention, a movable body, disposed within the chamber, carries the seat to selectively adjust the location of the piston in its neutral position by movement of the body within the chamber.

Preferably, the valve means further comprises a sealing member within the chamber. The seating member sealingly abuts the seat in the neutral mode, and is spaced from the seat in the first mode. The sealing member is biased toward the seat, and the piston abuts and moves the sealing member away from the seat in the first mode.

Preferably, the chamber comprises a bore in the valve body and the movable member comprises a spool axially movable within the valve bore. A biasing means biases the spool toward the inlet port and comprises a spring positioned between a first lip in the valve bore and a slip ring about the spool. The slip ring abuts a second lip on the spool, and a slip ring stop fixedly positioned within the valve bore abuts the slip ring when the spool is in the first location and prevents further movement of the slip ring toward the inlet port.

Preferably, the spool further comprises a first surface forming a portion of a first annular space in the valve body. A first port communicates with the first annular space, and application of pressurized air through the first port to the first annular space applies a force to the first surface tending to urge the spool in a first axial direction in the valve bore.

The spool can further comprise a second surface forming a portion of a second annular space in the valve body. A second port communicates with the second annular space, and application of pressurized air through the second port to the second annular space applies a force to the second surface tending to urge the spool in a second axial direction in the valve bore.

These and other objects, features and advantages of the invention will be apparent from the ensuing description in conjunction with the accompanying drawings.

BRIEF DESCRIPTION OF THE DRAWINGS

The invention will now be described with reference to the accompanying drawings, in which:

FIG. 3 is a sectional view of the height control valve of FIG. 1 shown in the exhaust mode with the spool positioned at an intermediate location;

FIG. 4 is a sectional view of the height control valve of FIG. 1 shown in the neutral mode with the spool at an innermost position; and FIG. 5 is a sectional view of the height control valve of FIG. 1 shown in the neutral mode with its spool at an outermost position.

DETAILED DESCRIPTION OF THE DRAWINGS

Figure 1:
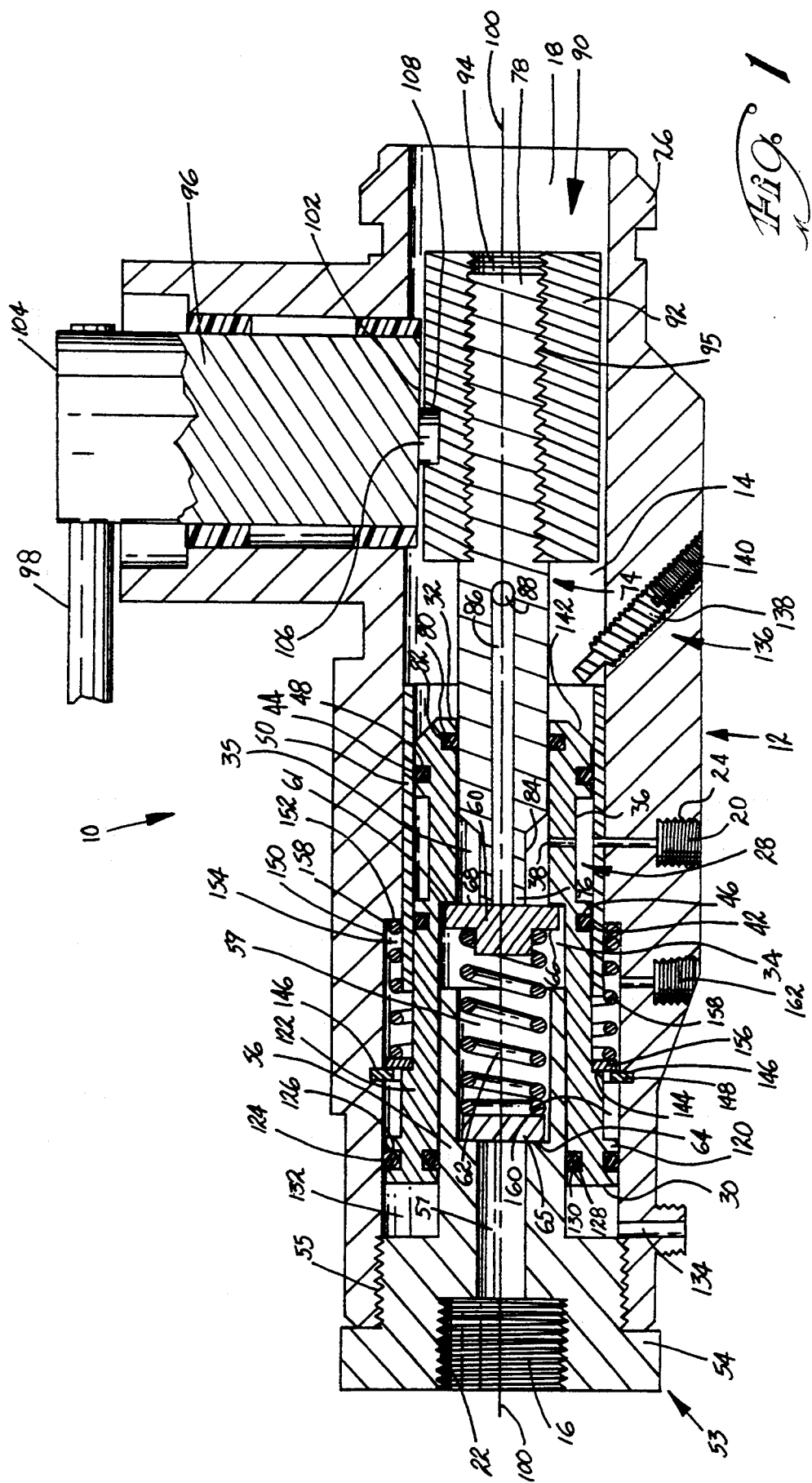
FIG. 1 is an elevational view in section of a height control valve, according to the invention, shown in the neutral mode with a spool positioned at an intermediate location.

Referring to the drawings and to FIG. 1 in particular, a typical height control valve assembly 10, according to the invention, for controlling the height of an air spring (not shown), comprises generally a valve body 12, having a chamber or bore 14 therethrough, an inlet port 16 at one end of the bore 14, an exhaust port 18 at the opposite end of the bore 14, and an air spring port 20 radially entering the central bore 14 through a central portion of the valve body 12. Internal threads 22 on the inlet port 16 and internal threads 24 on the air spring port 20 provide for interconnection to an air supply and air spring, respectively (not shown). No threads are provided on the exhaust port 18 as it simply exhausts to atmosphere. However, an annular flange 26 can be provided on the external surface of the valve body 12 adjacent the exhaust port 18 for attaching a muffling device (not shown).

A spool 28, positioned within the bore 14 adjacent the air spring port 20, directs the flow of air to and from the air spring port 20. The spool 28 comprises a first end 30, facing the inlet port 16, a second end 32, and a deep annular groove 36 about its outer circumference at a point intermediate the first end 30 and second end 32. A coaxial first central bore 34 enters the spool 28 from its first end 30; a coaxial second central bore 35 enters the spool 28 from its second end 32, and extends past the annular groove 36 to join the first central bore 34. A plurality of radial passages 38 extends between the annular groove 36 and the second central bore 35, placing the second central bore 35 into fluid communication with the air spring port 20.

The annular groove 36 is isolated from the remainder of the valve body bore 14 by means of O-ring seals 42, 44 on the spool 28. A first annular O-ring groove 46 about the outer circumference of the spool 28, to one side of the annular groove 36, receives the first O-ring seal 42, and a second annular O-ring groove 48 about the outer circumference of the spool 28, to the opposite side of the groove 36 and adjacent the spool second end 32, receives the second O-ring seal 44. An annular sleeve 50 is positioned within the valve bore 14 and extends axially from approximately the spool second end 32 past the O-ring 42. It is fixedly attached to the wall of the valve bore 14 and is sealed by the O-ring seals 42 and 44. The spring port 20 extends through the annular sleeve 50 into the valve bore 14.

An adapter 53 in the valve body bore 14 forms the inlet port 16. The adapter 53 has an annular flange 54, extending outwardly radially, which seats against the valve body 12, and a threaded section 55 which threads into the valve body bore 14. An O-ring seal (not shown) can be provided between the adapter flange 54 and the valve body 12. A narrower diameter extension tube 56 extends axially from the adapter 53 into the valve body bore 14, and has an open coaxial spring bore 59 at its inward end. A coaxial intermediate bore 57 connects the inlet port 16 with the spring bore 59, providing an open path through the adapter 53.

The spool first bore 34 and the narrower spool second bore 35 are joined by an annular lip 61. Similarly, an annular lip 64 joins the spring bore 59 and intermediate bore 57 of the adapter 53. An air seal or sealing member 60 in the spool first bore 34 seats against a valve seat formed by the annular lip 61, and a discoid shaped check valve 65 in the spring bore 59 seats against the annular adapter lip 64. A spring 62 operates between the check valve 65 and the air seal 60 to bias each against its respective seat. The air seal 60 has a circular discoid shape and comprises a first face 66 which seats the spring 62, and an opposite face 68 which abuts the annular spool lip 61 to seal the inlet port 16 from the second central bore 35 of the spool 28.

An exhaust piston or pin 74 controls the flow of air through the height control valve 10. The exhaust pin 74 is positioned coaxially within the spool second bore 35 and comprises a distal end 76 which abuts the air seal second face and a proximal end 78 positioned coaxially within the valve body bore at exhaust port 18. The outside diameter of the exhaust pin 74 is slightly less than the diameter of the spool second bore 35, providing a relatively close tolerance therebetween. A seal 80 fits within an annular groove 82 on the inside surface of the spool central bore 34, adjacent the spool second end 32, to pneumatically seal the exhaust pin 74 within the spool second bore 35.

The distal end 76 of the exhaust pin 74 has a reduced external diameter portion 84 which forms an annular air passage adjacent to the axial passageways 38. An interior compartment in the exhaust pin 74 is formed by a central coaxial bore 86 which extends from the distal tip 76 of the exhaust pin 74 to at least one radial passageway 88 which extends radially from the central bore 86 of the exhaust pin 74 outwardly to the exterior surface thereof. The radial passageway 88 exits the exhaust pin 74 proximal of the spool 28, thereby communicating the central bore 86 of the exhaust pin 74 with the valve body central bore 14 and thus with the exhaust port 18 and atmosphere. Thus, when the distal tip 76 of the exhaust pin 74 is away from the air seal 60, the air spring port 20 communicates with the atmosphere through the spool second bore 35 at the reduced diameter portion 84 of the exhaust pin, and the central bore 86 of the exhaust pin 74.

Movement of the exhaust pin 74 is controlled by a slide 90. The slide 90 comprises a circular body 92 having a threaded coaxial bore 94 therethrough. A threaded portion 95 of the exhaust pin 74 near its proximal end 78 is threaded into the threaded central bore 94 of the slide 90. Thus, axial movement of the slide 90 causes corresponding axial movement of the exhaust pin 74. A main shaft 96 extends radially into the valve body central bore 14 adjacent the slide 90. To effect rotation of the shaft 96, a control arm 98 extends outwardly radially from the main shaft 96 and is connected to a linkage (not shown) which senses the spacing distance which the height control valve 10 is installed to control. For instance, in a semitrailer suspension (not shown), the radial angle of the control arm 98 relative to the central axis 100 of the valve body central bore 14 would vary in response to the distance between the trailer frame (not shown) and axle (also not shown). In general, the spacing distance relates to the height of the air spring (not shown).

The main shaft 96 has an inward end 102 and an outward end 104. A pin 106 is eccentrically mounted to, and extends axially from, the inward end 102 of the main shaft 96, so that angular rotation of the main shaft 96 axially displaces the pin 106 within the valve body central bore 14. A partial annular groove 108 in the outer surface of the slide 90 receives the pin 106, so that axial displacement of the pin 106 correspondingly axially displaces the slide 90 within the valve body central bore 14.

FIG. 1 shows the height control valve 10 in the neutral position wherein air neither enters nor exits the air spring (not shown) through the air spring port 20. This state is achieved through the axial alignment of the spool annular lip 61 with the air seal 60 and the exhaust pin distal end 76. The inlet port 16 is isolated from the air spring port 20 by the air seal 60. The exhaust port 18 is isolated from the air spring port 20 by the sealing abutment of the distal end 76 of the exhaust pin 74 with the air seal 60, thus sealing the exhaust pin central bore 86 from the spool second bore 35.

Figure 2:
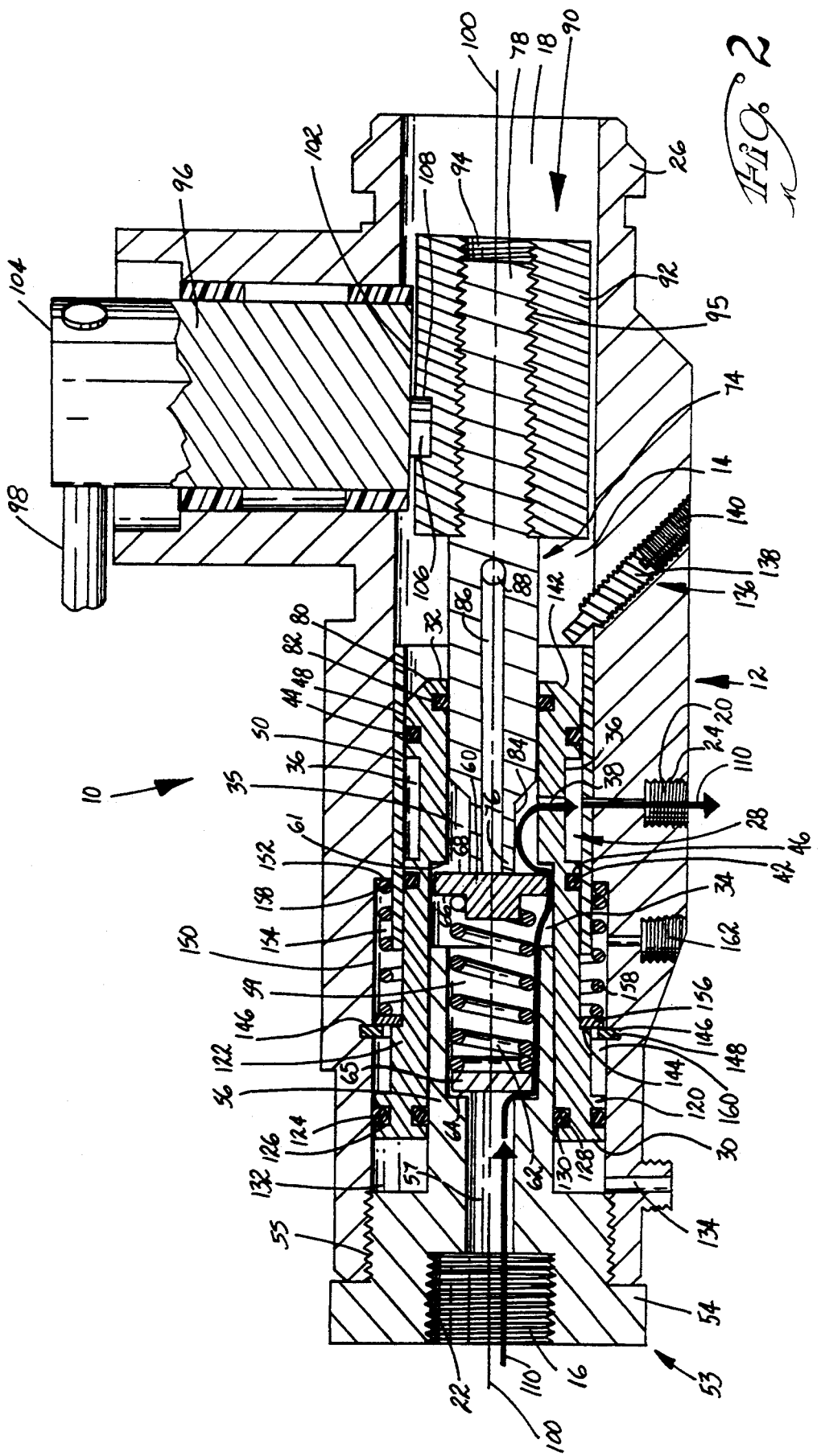
FIG. 2 is a sectional view of the height control valve of FIG. 1 shown in the intake mode with the spool positioned at an intermediate location.

Turning to FIG. 2, when the control arm 98 and the main shaft 96 rotate due to a decrease in the control height of the air spring (not shown), the slide 90 moves toward the spool 28, moving the exhaust pin 74 axially toward the air seal 60 so that the exhaust pin distal end 76 moves the air seal 60 away from the annular spool lip 61. Pressurized air then flows from the inlet port 16 to the air spring port 20 following an inflow path 110, comprising pressurized air flowing into the valve bore 14 through the inlet port 16, past the air seal 60, into the spool second bore 35, out of the spool 28, through the axial passageways 38, into the annular groove 36 and out through the air spring port 20, and into the air spring (not shown). As the air spring fills or as the height is otherwise changed, the main shaft 96 rotates back into the neutral position, as shown in FIG. 1, thereby preventing further in-flow of air into the air spring (not shown).

conversely, as shown in FIG. 3, when the control height of the air spring (not shown) exceeds the design parameter, the control arm 98 rotates the main shaft 96 in the opposite direction, moving the slide 90 axially away from the spool 28. The distal end 76 of the exhaust pin 74 moves away from its sealing abutment with the air seal 60. Air then flows from the air spring (not shown) through the air spring port 20, through the axial passageways 38 into the spool second bore 35, past the distal end 76 of the exhaust pin 74 and through the exhaust pin central bore 86 and the radial passageway 88 to the valve central bore 14 and, ultimately, to the atmosphere through the exhaust port 18, all of which comprise an outflow path 112.

Returning to FIG. 1, the relative position of the spool 28 within the valve bore 14 is adjustable axially to alter the height of the air spring (not shown) in the valve's neutral mode. In the neutral mode, the valve pin distal end 76, the valve seal 60, and the spool annular lip 61 align. Axially adjusting the position of the spool annular lip 61 within the valve bore 14 changes the angular position of the main shaft 96 in its neutral position, thereby altering the height of the air spring (not shown) in the neutral mode of the height control valve 10. To effect this adjustment, the spool 28 is axially movable between three discrete positions within the valve bore 14.

An outer annular flange 120 extends outwardly radially from the spool 28 at its first end 30, and an intermediate annular flange 122, of lesser diameter than the outer annular flange 120, extends outwardly radially from the spool 28 adjacent the outer annular flange 120. An O-ring seal 124 positioned within an annular groove 126 about the outer annular circumference of the outer annular flange 128 seals the spool 28 to the wall of the valve bore 14 at the spool first end 30.

The adapter extension tube 56 extends coaxially into the first spool bore 34 from the spool first end 30, and is sealed thereto by an O-ring 128 positioned within an annular groove 130 in the wall of the first spool bore 34, axially aligned with the O-ring 124 on the spool outer annular flange 120. A first annular space 132 is thus created between the spool first end 30, the wall of the spool bore 14, and the adapter 53.

A raising port 134 extends radially from the exterior of the valve 10 into the first annular space 132. Application of pressurized air to the first annular space 132 through the raising port 134 applies pressure against the spool first end 30 tending to urge the spool 28 inwardly of the height control valve 10, or away from the inlet port 16. When the spool 28 is moved inwardly of the height control valve 10 in this manner, the exhaust pin 74 and air seal 60 retain their relative position within the valve body 12, causing the spool annular lip 61 to move away from its sealing abutment with the air seal 60. Air flows from the inlet port 16 past the air seal 60 and out through the spring port 20 to expand the air spring (not shown), until such expansion causes the exhaust pin distal end 76 to come back into alignment with the spool annular lip 61, whereupon the air seal 60 regains its sealing abutment with the spool annular lip 61.

An adjustable stop 136 limits inward movement of the spool 28. The adjustable stop 136 comprises a screw 138 threaded through a sloping bore 140 and extending into the valve bore 14 to abut a chamfered annular edge 142 on the second end 32 of the spool 28. Adjustment of the axial position of the screw 138 inside the sloping bore 140, consequently adjusts the maximum raised height of the height control valve 10.

A coil spring 158 biases the spool 28 toward an intermediate position within the valve bore 14. One end of the spring 158 abuts a slip ring 156 which encircles the spool 28 adjacent an annular shoulder 144 formed at the inward end of the spool intermediate flange 122. An annular groove 146 in the wall of the valve body bore 14 at the annular shoulder 144 retains an annular ring-shaped stop 148. The slip ring 156 is slidable along the spool 128, yet may not pass beyond the spool shoulder 144 or the stop 148. The valve bore 14 expands into a larger diameter section 150 near the inlet port 16 forming a shoulder 152 in the wall of the value bore 14 against which the opposite end of the spring 158 abuts. The annular sleeve 50 extends pass the valve bore shoulder 152 to form an annular space 154 between the sleeve 50 and the wall of the valve bore larger diameter section 150.

The coil spring 158, positioned between the slip ring 156 and the valve bore annular shoulder 152, biases the spool 28 toward the inlet end of the valve bore 14. The spring 158 applies a force against the slip ring 156, which in turn applies a force against the spool annular shoulder 144 which overcomes the inward bias of the spring 62 and pressurized air acting against the air seal 60 to bias the spool 28 outwardly of the valve bore 14. However, outward movement of the slip ring 156 is limited by the annular stop 148, thereby positioning the spool 28 at an intermediate position within the valve bore 14. (Outward movement of the spool 28 is not limited by the annular stop 148).

The spool 28 can be moved away from the intermediate position to alter the design spacing at the neutral position of the height control valve 10. As Previously described, application of pressurized air to the raising port 134 overcomes the bias of the spring 158 to urge the spool 28 inwardly (see FIG. 4). Also, pressurized air can be used to move the spool 28 outwardly from its intermediate position (see FIG. 5).

A second annular space 160 is formed between the spool 28, and the wall of the valve bore larger diameter section 150, which is bounded at one end by the valve bore shoulder 152, and at its opposite end by the spool outer annular flange 120. A lowering port 162 radially penetrates the valve body 12 to enter the second annular space 160. The second annular space 160 is continuous; the annular stop 148 and the annular ring 156 do not impede the passage of air there through space 160. Thus, application of pressurized air to the lowering port 162 applies pressure against the spool outer annular flange 120, urging the spool 28 outwardly of the valve bore 14.

The normal operating position of the spool 28 is illustrated in FIGS. 1, 2, and 3. Pressurized air at the inlet port 16 acts against the air seal 60 biases the spool 28 inwardly of the height control valve 10, or away from the inlet port 16. However, the spring 158 biases the spool 28 against the stop 148 to locate the spool 28 in a central position. FIG. 4 illustrates the spool 28 in the fully raised position. Air pressure is applied to the raising port 134, pressurizing the first annular space 132, whereby the pressure on the first annular space 132 acts against the first end 30 of the spool 28 with sufficient force to overcome the bias of the spring 158. Continued application of the pressure to the raising port 134 moves the spool 28 inwardly of the height control valve 10 until the spool's chamfered end 142 contacts the adjustable stop 136. This is the position illustrated in FIG. 4. FIG. 5 illustrates the spool 28 in the lowered position. Pressurized air is applied to the lowering port 162, pressurizing the second annular space 160, thereby applying pressure against the spool outer annular flange 120 to urge the spool 28 outwardly of the height control valve 10, or toward the inlet port 16.

Reasonable variation and modification are possible within the scope of the foregoing disclosure and drawings without departing from the spirit of the invention, as defined in the accompanying claims.

The embodiments of the invention in which an exclusive property or privilege is claimed are as follows:

1. In a height control valve for an air spring, said height control valve comprising a valve body having an internal chamber, an inlet port, an exhaust port, and a spring port, each of said ports being in communication with the internal chamber, valve means comprising a piston within the chamber for controlling alternate communication between the inlet port and spring port in a first mode, and between the exhaust port and the spring port in a second mode, and closing communication between all of the ports in a neutral mode, said valve means further comprising a seat within the chamber, and said piston having an end proximal to the seat and being adapted for operative connection to a height sensing means for the air spring, and reciprocally movable within the chamber in response to changes in the height of the air spring between a first position wherein the piston end extends past the seat in the first mode, a second position wherein the piston end is withdrawn from and spaced away from the seat in the second mode, and a neutral position wherein the piston end is aligned with the seat in the neutral mode, the improvement wherein:

a movable body is disposed within the chamber for reciprocal movement therein in first and second axial directions and the seat is carried by the movable body whereby to selectively adjust the neutral position of the piston by movement of the body within the chamber, the movable body further having first and second opposing surfaces; and;

the valve body having first and second control cavities partially defined by the first and second opposing surfaces, respectively, each of said first and second control cavities being in communication with a source of pressurized fluid, wherein admission of pressurized fluid to the first control cavity will urge the movable body in the first axial direction and admission of pressurized fluid to the second control cavity will urge the movable body in the second axial direction so that the neutral position of the piston can be adjusted.

2. The improvement according to claim 1 wherein the valve means further comprises a sealing member within the chamber, the sealing member sealingly abutting the seat in the neutral mode, and the sealing member is away from the seat in the first mode.

3. The improvement according to claim 2 wherein the sealing member is biased toward the seat, and the piston abuts and moves the sealing member away from the seat in the first mode.

4. The improvement according to claim 2 wherein the piston further comprises a bore open to the piston end, the piston bore communicating with the exhaust port, and the open end of the piston bore sealingly abuts the sealing member in the neutral mode, and the open end of the piston bore is away from the sealing member in the second mode.

5. The improvement according to claim 4 wherein the movable body further comprises an interior compartment communicating with the spring port, the compartment having an inlet aperture at the seat between the compartment and the inlet port, and the sealing means seals the inlet aperture in the neutral position.

6. The improvement according to claim 5 wherein the piston extends into the compartment and the compartment communicates with the exhaust port through the piston bore in the second mode.

7. The improvement according to claim 1 wherein the chamber comprises a valve bore in the valve body and the movable member comprises a spool axially movable within the valve bore.

8. The improvement according to claim 7 wherein the spool further comprises an interior compartment communicating with the spring port, and the valve means comprises a sealing member biased against the seat, and in the neutral mode the sealing member sealingly abuts the seat to seal the compartment from the inlet port.

9. The improvement according to claim 8 wherein the compartment comprises a bore in the spool, the seat comprises a shoulder at one end of the spool bore, the piston extends through the spool bore from an opposite end of the spool bore, and the open end of the piston bore sealingly abuts the sealing member in the neutral mode.

10. The improvement according to claim 7 wherein a biasing means biases the spool to a first location within the chamber.

11. The improvement according to claim 10 wherein the spool biasing means biases the spool toward the inlet port and comprises a spring positioned between a first lip in the valve bore and a slip ring about the spool, the slip ring abutting a second lip on the spool, and a slip ring stop fixedly positioned within the valve bore which abuts the slip ring when the spool is in the first location and prevents further movement of the slip ring toward the inlet port.

12. A height control valve for controlling the delivery and exhaustion of pressurized air to and from an air spring to maintain the air spring at a predetermined length, the height control valve comprising:

a valve body having a chamber;
a supply port communicating with the chamber and adapted to be connected to a source of pressurized air;
a spring port in communication with the chamber and adapted to be connected to an air spring;
an exhaust port in the valve body;
a seat in the valve body between the supply port and the chamber;
a sealing member in the valve body biased against the seat but at least a portion thereof being movable away from the seat;
a hollow piston reciprocally mounted within the chamber and having a bore with an open end, the piston bore being in communication with the exhaust port, the open end of the piston bore extending into the chamber from the exhaust port towards the sealing member, whereby when the open end of the piston bore sealingly abuts the sealing member the exhaust port is sealed from the spring port and when the open end of the piston bore is away from the sealing member the spring port communicates with the exhaust port through the piston bore;
the piston being adapted for operative connection to a control means for sensing the length of the air spring, and axially moving the piston within the chamber in response to changes in the length of the air spring, to alternately place the height control valve into a neutral position, a supply position, and an exhaust position, wherein:
the neutral position of the height control valve comprises the sealing member sealingly abutting the seat, and the open end of the piston bore sealingly abutting the sealing member, whereby the spring port is sealed from both the supply port and the exhaust port;
the supply position comprises the piston holding at least a portion of the sealing member away from the seat whereby the supply port communicates with the spring port; and
the exhaust position comprises the open end of the bore being away from the sealing member whereby the spring port communicates with the exhaust port through the piston bore; and
adjusting means for moving the location of the seat relative to the valve body,
the adjusting means comprising a spool axially movable within the chamber;
the spool further carrying the seat and having a first surface defining a portion of a first annular space in the valve body, and a second surface defining a portion of a second annular space in the valve body; and
the valve body having a first port in communication with the first annular space and a second port in communication with the second annular space, whereby selective admission of pressurized air through the first port to the first annular space or through the second port to the second annular space tends to urge the spool in a first axial direction or a second axial direction, respectively.

13. The improvement according to claim 12 wherein the chamber comprises a valve bore in the valve body and the adjusting means comprises the seat being formed on a spool, the spool being axially movable within the valve bore.

14. The improvement according to claim 13 wherein the spool further comprises a spool bore in the spool communicating with the spring port, the seat comprises a shoulder at one end of the spool bore, the piston extends through the spool bore from an opposite end of the spool bore, and the exhaust position comprises the piston holding the sealing member away from the seat.

15. In a height control valve for an air spring, said height control valve comprising a valve body having an internal chamber, an inlet port, an exhaust port, and a spring port, each of said ports being in communication with the internal chamber, valve means comprising a piston within the chamber for controlling alternate communication between the inlet port and spring port in a first mode, and between the exhaust port and the spring port in a second mode, and closing communication between all of the ports in a neutral mode, said valve means further comprising a seat within the chamber, and said piston having an end proximal to the seat and being adapted for operative connection to a height sensing means for the air spring, and reciprocally movable within the chamber in response to changes in the height of the air spring between a first position wherein the piston end extends past the seat in the first mode, a second position wherein the piston end is withdrawn from and spaced away from the seat in the second mode, and a neutral position wherein the piston end is aligned with the seat in the neutral mode, the improvement comprising:
- a movable body disposed within the chamber for movement therein, the seat being carried by the movable body whereby to selectively adjust the neutral position of the piston by movement of the body within the chamber;
- a catch slidably received on the moveable body;
- a first lip on the moveable member extending into the chamber;
- a stop on the valve body extending into the chamber in a position to abut the catch when the moveable member is in a centered position within the chamber; and
- biasing means within the valve body for urging the catch toward abutment with the first lip and thereby urging the catch and moveable body in a first direction until the catch abuts the stop whereby the centered position defines a normal ride height for the air spring and movement of the moveable body away from the centered position alters the normal ride height controlled by the control valve.

16. The improvement according to claim 15 further comprising a second lip on the valve body extending into the chamber and wherein the biasing means comprises a spring between the second lip and the catch.

17. The improvement according to claim 16 wherein the spring comprises a coil spring, and the moveable body is coaxially received within coils of the coil spring.

18. The improvement according to claim 16 wherein the catch comprises a ring encircling the moveable body.

19. The improvement according to claim 16 further comprising a moveable body receiving surface within the chamber along which the moveable body is axially moveable, the moveable body receiving surface coaxially receiving the moveable body and extending axially beyond the second lip toward the stop.

20. The improvement according to claim 19 wherein the moveable body receiving surface comprises a separate liner received within the chamber.

21. The improvement according to claim 15 wherein the stop comprises a shoulder on the valve body extending into the chamber.

22. In a height control valve for an air spring, said height control valve comprising a valve body having an internal chamber, an inlet port, an exhaust port, and a spring port, each of said ports being in communication with the internal chamber, valve means comprising a piston within the chamber for controlling alternate communication between the inlet port and spring port in a first mode, and between the exhaust port and the spring port in a second mode, and closing communication between all of the ports in a neutral mode, said valve means further comprising a seat within the chamber, and said piston having an end proximal to the seat and being adapted for operative connection to a height sensing means for the air spring, and reciprocally movable within the chamber in response to changes in the height of the air spring between a first position wherein the piston end extends past the seat in the first mode, a second position wherein the piston end is withdrawn from and spaced away from the seat in the second mode, and a neutral position wherein the piston end is aligned with the seat in the neutral mode, the improvement wherein:
- a movable body is disposed within the chamber for movement therein and the seat is carried by the movable body whereby to selectively adjust the neutral position of the piston by movement of the body within the chamber; and
- an adjustable stop extends into the chamber from the valve body, the adjustable stop abutting and limiting movement of the moveable body in at least one direction.

23. The improvement according to claim 22, wherein the adjustable stop comprises a screw threaded through a screw aperture in the valve body and having an end extending into the chamber, the end of the screw abutting and limiting movement of the moveable body in the at least one direction, and the screw aperture being oriented at an non-right angle to the at least one direction whereby axial movement of the screw though the screw aperture effects movement of the end of the screw in the chamber having a component in the at least one direction.

24. The improvement according to claim 22 wherein the moveable body comprises an annular spool and the annular spool further comprise an annular chamfered edge for abutment with the screw end.

* * * * *